United States Patent
Cheung et al.

(10) Patent No.: US 10,715,344 B2
(45) Date of Patent: Jul. 14, 2020

(54) METHOD OF ESTABLISHING A VIDEO CALL USING MULTIPLE MOBILE COMMUNICATION DEVICES

(71) Applicant: Shirley ShiuLing Cheung, Sai Wan Ho (HK)

(72) Inventors: Shiu Ling Cheung, Sai Wan Ho (HK); Sui Kei Cheung, Quarry Bay (HK)

(73) Assignee: Shirley Shiu Ling Cheung, Sai Wan Ho (HK)

( * ) Notice: Subject to any disclaimer, the term of this patent is extended or adjusted under 35 U.S.C. 154(b) by 151 days.

(21) Appl. No.: 15/858,830

(22) Filed: Dec. 29, 2017

(65) Prior Publication Data

US 2018/0343135 A1 Nov. 29, 2018

(30) Foreign Application Priority Data

May 26, 2017 (HK) .................................. 17105344.3

(51) Int. Cl.
*G06F 15/16* (2006.01)
*H04L 12/18* (2006.01)
(Continued)

(52) U.S. Cl.
CPC ...... *H04L 12/1827* (2013.01); *H04L 12/1831* (2013.01); *H04L 51/046* (2013.01);
(Continued)

(58) Field of Classification Search
CPC ............. H04L 12/1827; H04L 12/1831; H04L 51/046; H04M 3/42127
(Continued)

(56) References Cited

U.S. PATENT DOCUMENTS 7,084,898 B1 * 8/2006 Firestone ............... H04N 7/152
348/14.08
2004/0230655 A1 * 11/2004 Li ........................... H04N 7/15
709/205
(Continued)

FOREIGN PATENT DOCUMENTS

CN WO2015010561 1/2015
CN 105515937 A1 4/2016
(Continued)

OTHER PUBLICATIONS

PCT/CN2018/078510, filed Mar. 9, 2018; ISR, mailed May 31, 2018.

*Primary Examiner* — Atta Khan

(57) ABSTRACT

The invention relates, but is not limited, to mobile communications technology. The invention enables a user to use two separately operating electronic communications devices to communicate with one or more other electronic data processing and/or communication devices, where a first of the two communications devices associated with the user is configured to handle, e.g. receive and/or transmit, media of a different type to the media handled by a second of the two devices associated with said user. The method comprises establishing electronic communication of a first media type between a first electronic communication device of said user and a data processing device and establishing electronic communication of a second, different media type between a second electronic communication device of said same user and said data processing device. The data processing device may comprise a server such as a cloud based server. The first and second communications devices of a user may be associated with a same user log in account or different log in accounts of the same user. In one embodiment, the first electronic communication device of the user is used by said user for a video conference session and the second electronic (Continued)

communication device is used by said user for transmitting and/or receiving discrete media files such as, but not limited to, still images, text documents, SMS messages, etc. within the same video conference session. The invention allows discrete media data to be transmitted in parallel with video conferencing data within the same video conference session such that participants in the video conference session have access to both the video conferencing images and the discrete media files provided by one or more of the participants.

19 Claims, 6 Drawing Sheets

(51) Int. Cl.
    *H04L 12/58*     (2006.01)
    *H04M 3/42*     (2006.01)
    *H04M 7/00*     (2006.01)
    *H04M 3/56*     (2006.01)

(52) U.S. Cl.
    CPC ... *H04M 3/42127* (2013.01); *H04M 3/42263* (2013.01); *H04M 3/567* (2013.01); *H04M 7/0027* (2013.01); *H04M 2201/50* (2013.01); *H04M 2207/18* (2013.01)

(58) Field of Classification Search
    USPC .......................................................... 709/204
    See application file for complete search history.

(56) References Cited

U.S. PATENT DOCUMENTS

| | | | | |
|---|---|---|---|---|
| 2008/0137690 A1* | 6/2008 | Krantz | ................ | H04Q 3/0025 370/503 |
| 2008/0195704 A1* | 8/2008 | Salesky | ................ | G06F 3/1415 709/204 |
| 2015/0095933 A1* | 4/2015 | Blackburn | .......... | H04M 7/0078 725/25 |
| 2016/1322211 | 5/2016 | Comigo Ltd | | |

FOREIGN PATENT DOCUMENTS

| | | |
|---|---|---|
| CN | 105451198 A | 5/2016 |
| CN | 106303350 A | 1/2017 |
| CN | 106303449 A | 1/2017 |
| CN | 106469388 A1 | 3/2017 |
| CN | 206712945 U | 12/2017 |

\* cited by examiner

METHOD OF ESTABLISHING A VIDEO CALL USING MULTIPLE MOBILE COMMUNICATION DEVICES

FIELD OF THE INVENTION

The invention relates, but is not limited, to mobile communications technology. The invention relates particularly, but not exclusively, to a method of establishing a video call using mobile electronic communications devices. The invention is more particularly concerned with providing enhanced video call functionality on mobile electronic communication devices.

BACKGROUND OF THE INVENTION

With the development of communications technology and the popularization of mobile terminals such as smart phones, phablets and tablet computers and the like, video calling, as an important service in the field of communications, is being favored by more and more users. More and more users are choosing to communicate through video calls for personal and for business meetings. Generally, in a video call such as, for example, a video conference session, one concern is maintaining good visual and audio connection between the parties to the video call whilst enabling the parties to the video call to periodically exchange information by, for example, sending each other media files or media data such as, for example, still images, text documents, instant messages and the like. However, with existing arrangements, it is typically the case that a user is required to pause a video call on their mobile terminal in order to then use such mobile terminal to send an image or a text document or the like to one or more other participants to the video call and to then resume the video call on their mobile terminal once the discrete media data sending operation is completed. Likewise, the receiving party also typically needs to pause the video call on their mobile terminal in order to receive and view a discrete media file received from another participant before resuming the video call on their mobile terminal. This type of video call arrangement may be generally acceptable to users involved in video calls where there is little or no need to periodically exchange information such as discrete media data or where there is little or no need for exchanged media data to be accessed during the video call session.

In other video call arrangements where a participant is not required to pause the video call in order to send or receive discrete media files or data such as in the case where the display of the mobile terminal is split into two regions; a first region for viewing the video call and a second region for viewing discrete media data or files; problems are still encountered in that users have a tendency to re-orientate the position of their mobile terminal dependent on whether they are viewing the video call on the first region of the screen or viewing discrete media data or files on the second region of the screen. The re-orientation of the mobile terminal during the video call may disrupt the video and/or audio connection with other participants which is undesirable where the participants are engaged in an exchange of views and information.

The aforementioned types of video call arrangement are not generally suitable for video call applications where participants need to frequently exchange discrete media files or data whilst sharing opinions and views on the exchanged discrete media files or data, for example, in collaborative technical development video calls such as brain-storming sessions or the like.

There is therefore a need for improved or enhanced video call functionality for mobile terminals.

OBJECTS OF THE INVENTION

An object of the invention is to provide improved or enhanced video call and media data handling functionality for mobile terminals.

The above object is met by the combination of features of the main claims; the sub-claims disclose further advantageous embodiments of the invention.

Another object of the invention is to mitigate or obviate to some degree one or more problems associated with known methods of establishing video calls on mobile terminals.

Yet a further object of the invention is to provide improved or enhanced video teleconferencing functionality for mobile terminals including improved or enhanced discrete media data exchange between the mobile terminals of participants during the video teleconference.

Yet a further object of the invention is to provide improved or enhanced video teleconferencing functionality for mobile terminals which is ergonomically more user-friendly for video call participants.

One skilled in the art will derive from the following description other objects of the invention. Therefore, the foregoing statements of object are not exhaustive and serve merely to illustrate some of the many objectives of the present invention.

SUMMARY OF THE INVENTION

The invention relates particularly, but not exclusively to a method of establishing a video call using multiple mobile communications devices. The invention is more particularly concerned with providing a user with enhanced video call and media data handling functionality through using simultaneously at least two of the user's mobile electronic communication devices.

The invention enables a user to use two or more separately operating electronic communications devices to communicate with one or more data processing devices and/or communication devices where a first of the user's two communications devices is configured to handle, e.g. receive and/or transmit, media of a first type which is different to media of a second type sent and/or received, i.e. handled, by a second of the same user's two devices. The method comprises establishing electronic communication of a first media type between a first electronic communication device of said (first) user and a data processing device and establishing electronic communication of a second, different media type between a second electronic communication device of said same user and said data processing device. The data processing device may comprise a server such as a cloud based server. The first and second communications devices of a user may be associated with a same user application ("APP") log in account or different log in accounts of the same user. The log in accounts may relate to one or more session-based teleconferencing applications.

In one embodiment, the first electronic communication device of the user is used by said user for a video conference session and the second electronic communication device is used by said user for transmitting and/or receiving discrete media files such as, but not limited to, still images, text documents, SMS messages, etc. within the same video conference session. The invention allows discrete media data to be transmitted in parallel with video conferencing data within the same video conference session such that participants in the video conference session have access to both the video conferencing moving images and the discrete media files provided by one or more of the participants on respective electronic communications devices such as, but not limited to, mobile terminals, although it is not essential that each participant to a video call employs two or more mobile terminals.

In one embodiment, the enhanced video calling method includes receiving a log in request from the user's first mobile terminal and a log in request from the user's second mobile terminal. In response to receipt of said first and second log in requests, a data processing device such as a server establishes a video call connection with the first mobile terminal based on the first log in request and establishes an information transmission connection, e.g. channel, with the second mobile terminal based on said second log in request. The data processing device preferably synchronizes the video call connection on the first mobile terminal with the information transmission connection on the second mobile terminal.

One of many advantages provided by the invention is that it is not necessary to suspend the video call when a user wishes to transmit to or receive from the data processing device information such as discrete media files, because the video call can continue uninterrupted on the user's first communications device whilst the user transmits from or receives information such as discrete media files at their second communication device. Furthermore, it is not necessary for the user to reposition or manipulate in any other way their first communications device when receiving discrete media data as the processing for transmission, reception and/or display of such discrete media data is performed only at the user's second communication device. The invention therefore provides an improved or enhanced video call experience for the user with enhanced functionality for video call and media data handling provided by the combination of the simultaneously operating first and second communication devices, e.g. mobile terminals, even though said devices operate generally independently of one another.

Therefore, in a first main aspect, the invention provides a method of communicating electronically, the method comprising the steps of establishing electronic communication of a first media type between a first electronic communication device of a user and a data processing device and establishing electronic communication of a second, different media type between a second electronic communication device of the same user and said data processing device.

In a second main aspect, the invention provides a data processing device comprising a processor for executing machine code and a non-transitory storage device for storing machine code. The data processing device is configured such that, when said processor executes the machine code stored on the non-transitory storage device, the data processing device is caused to implement the steps of the method according to the first main aspect of the invention.

In a third main aspect, the invention provides an electronic communications system comprising the data processing device of the second main aspect of the invention, a first electronic communication device associated with a user and a second electronic communication device associated with the same user. The system is arranged such that, when the data processing device is controlled to implement the steps of the method of the first main aspect of the invention, the data processing device establishes electronic communication of a first media type with the first electronic communication device and establishes electronic communication of a second, different media type with the second electronic communication device.

In a fourth main aspect, the invention provides a non-transitory storage medium for a data processing device, said non-transitory storage medium storing machine code which, when executed by a processor causes the data processing device to implement the steps of the method according to the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS, may be implemented in various forms of hardware, software or combinations thereof. Preferably, these elements are implemented in a combination of hardware and software on one or more appropriately programmed general-purpose devices, which may include a processor, memory and input/output interfaces.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

The embodiments of the present invention provide a video calling method and apparatus or system, which can be implemented by a data processing device such as a server. The server may comprise a cloud based server, i.e. a cloud server.

One advantage provided by the embodiments of the present invention is to reduce, prevent or eliminate the need for a user to suspend a video call during the call when trying to transmit, receive, modify and/or edit information of a discrete nature, e.g. a text document or a still image or the like. Preferably, the video call and the discrete information transmission are synchronized such as to not interrupt or affect each other.

Embodiment 1

Figure 1:
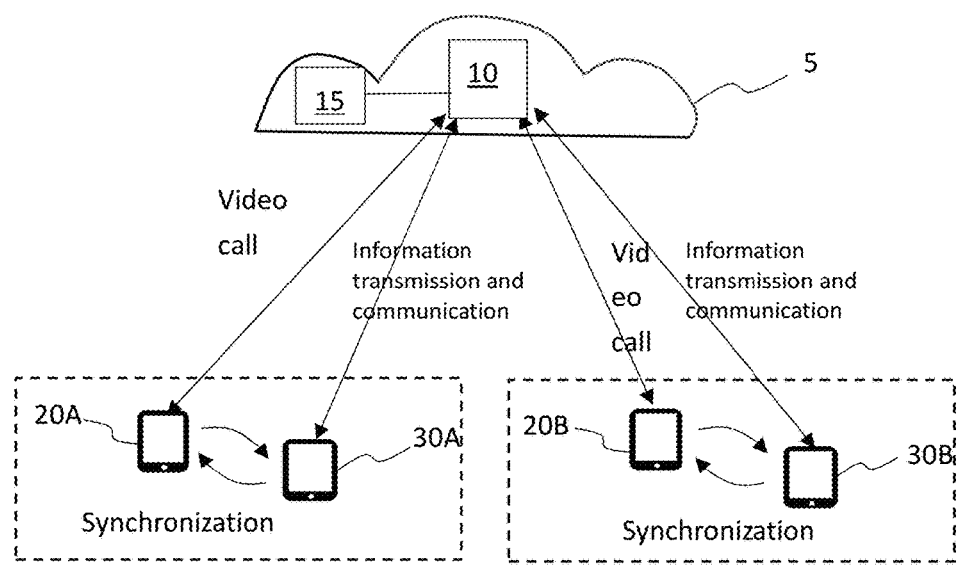
FIG. 1 is a schematic diagram of a video call system provided by an embodiment of the present invention.

Referring to FIG. 1, shown by way of example is a schematic diagram of a video call or conference system 1 in accordance with an embodiment of the present invention. In FIG. 1, an application environment for implementing a video call or video conference is illustrated and comprises a server 10, a first electronic communications device in the form of a first mobile terminal 20A of a first user, a second electronic communications device in the form of a second mobile terminal 30A of the same first user, a first mobile terminal 20B of a second user, and a second mobile terminal 30B of the second user. It will be understood that the system 1 may involve more than two users, each user having respective first and second mobile terminals 20, 30, although it is not essential that every user has two or more mobile terminals. It will also be understood that, whilst the following description refers to users employing (first and second) mobile terminals, the invention is not limited to the use of only mobile terminals. To receive the enhanced functionality provided by the invention, a user may employ two or electronic communications devices of the type having display screens, one of such devices capable of displaying a video call and another of said devices capable of displaying discrete media such as still images, text documents or messages, or the like.

The server 10 may comprise a network based server such as a cloud server operating in a public network such as the internet 5 or a server operating in a private network or any combination of the foregoing. The server 10 may comprise two or more cooperating (cloud) servers configured to handle respective parts of the messaging and data transmission necessary to establish a video call or video conference call as hereinafter described.

In the embodiment of FIG. 1, a video call may comprise an ad hoc video call between two or more users implemented using a suitable application ("APP") or applications ("APPs") provisioned on the users' first and second mobile terminals 20A,B and 30A,B or it may comprise a more formal video call communication between two or more users such as a specific business conference comprising a multi-party creative conference, a brainstorming conference, or the like, during which, users send and receive a considerable number of discrete media files or messages. The more formal video call may comprise a session-based teleconference implemented by a suitable APP or APPs provisioned on the users' first and second mobile terminals 20A,B and 30A,B.

Whilst the following description relates to the establishment of video calls between mobile terminals via one or more servers, it will be understood that, in some embodiments, a video call as hereinafter described may be established on a peer to peer basis between first and second mobile terminals of a first user and first and second mobile terminals of a second user without the need for server based signaling.

As can be seen in FIG. 1, each user participating in the video call preferably operates two mobile terminals, namely a first mobile terminal 20 and a second mobile terminal 30, although it will be understood that some users may participant with a single mobile terminal. In other words, whilst the enhanced video call functionality of the present invention is implemented for users operating first and second mobile terminals as herein described, the system of the invention does not preclude the participation in a video call of users operating a single conventionally provisioned mobile terminal, but such users operating a single conventionally provisioned mobile terminal may not have access to all of the enhanced functionality of the present invention.

The first mobile terminal 20 and the second mobile terminal 30 for each user are preferably configured to each send a log in request to the server 10. Each user may configure their first and second mobile devices 20, 30 to send a log in request based on a single user account registered with the server 10, or may configure their first and second mobile devices 20, 30 to send separate log in requests based on separate respective user accounts registered with the server 10, although with the separate respective user accounts being registered to the same user. For example, the user may log in to an APP on the first mobile terminal 20 using "account 1" and send a log in request to the server 10, and then log in to the same or a different APP on the second mobile terminal 30 using the same "account 1" and send another log in request to the server 10. Alternatively, the user may log in to an APP on the first mobile terminal 20 using "account 1" and send a log in request to the server 10, and then log in to the same or a different APP on the second mobile terminal 30 using a different "account 2" and send another log in request to the server 10. Thus, it will be understood that the user's log in method is not limited to a single user account and/or using a single, same APP on the first and second mobile terminals 20, 30. Consequently, it will be understood that the APP used for log in by the first mobile terminal 20 and the APP used for log in by the second mobile terminal 30 may comprise the same APP, or may comprise two independent APPs. For example, the first mobile terminal 20 may log in based on "APP-1" whilst the second mobile terminal 30 also logs in based on "APP-1". Alternatively, the first mobile terminal 20 may log in based on "APP-1 and the second mobile terminal 30 may log in based on "APP-2". Furthermore, first mobile terminal 20 and the second mobile terminal 30 associated with a user may log in concurrently or not concurrently. APP-1 may therefore be configured as a video conference call APP and APP-2 may be configured as a 'whiteboard' APP.

Once a user's log in requests are received by the server 10, whether concurrently or not concurrently, the server allows the first mobile terminal 20 and the second mobile terminal 30 of said user to log in according to a log in scheme defined by APP1 and/or APP2 as appropriate.

In some embodiments, after the first mobile terminal 20 and the second mobile terminal 30 of a user log in with the server 10, each of the first mobile terminal 20 and the second mobile terminal 30 of said user sends a video call request to the server 10. Based on the video call requests, the server 10 establishes a video call at the first mobile terminal 20 and synchronously establishes an information transmission communication connection with the second mobile terminal 30. Preferably, the server 10 ensures that the video call and the information transfer communication connection are initiated simultaneously, although this is not essential. Based on other video call requests received by the server 10 from other user mobile terminal devices, the server 10 establishes the video call between the first mobile terminal 20A of the first user and the first mobile terminals 20B of the other users. The server also establishes the information communication connection between the second terminal 30A of the first user and second terminals 30B of the other users. Preferably, the server 10 establishes the video call between the users' first mobile terminals 20 synchronously with establishment of the information communication connection between the users' second mobile terminals 30 thereafter enabling users to exchange discrete media files or messages between their respective second mobile terminals 30 which does not affect the fluency of the video call between the users' respective first mobile terminals 20.

It will be understood that the initial log in requests sent from each user's first and second mobile terminals 20, 30 may comprise a combined user log in request and a video call request which reduces signaling between the users' mobile terminals 20, 30 and the server 10.

Figure 2:
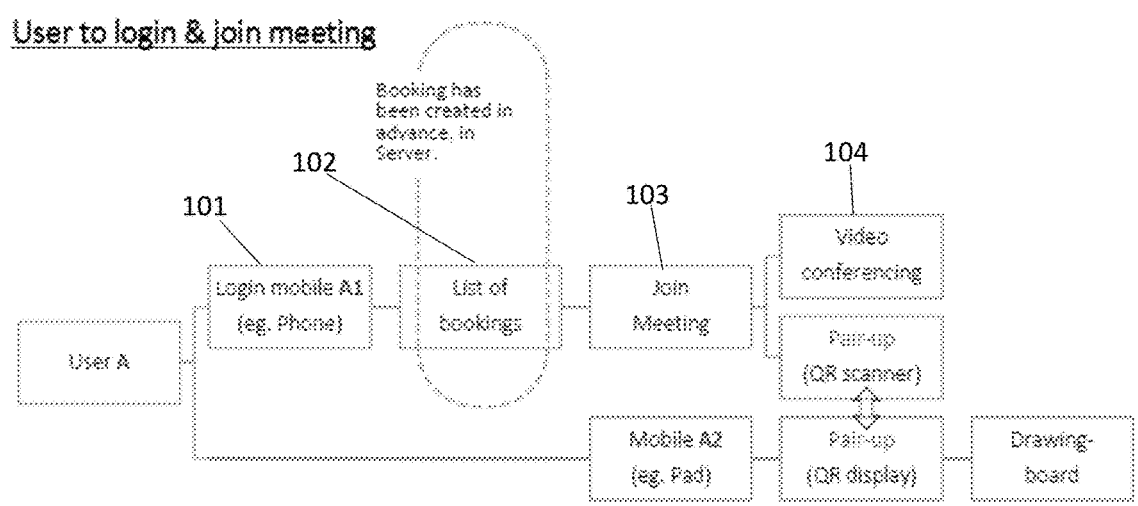
FIG. 2 is a schematic representation of a preferred method for a user to log in and join a video conference call using first and second mobile terminals.

Referring to FIG. 2, shown is a schematic representation of one preferred method for a user A to log in and join a video conference using his first and second mobile terminals A1, A2. In a first step 101, user A uses the APP on his first mobile terminal A1, e.g. his smart phone, to initiate a log in request to the server 10 and then, in a next step 102, accesses within the server 10 a list of bookings to select the booking he wishes to join. Having selected the desired booking, user A in a next step 103 joins the meeting. Either in response to the log in request 101 or a specific video call request from user A's first mobile terminal A1, the server 10 enables the first mobile terminal A1 in a next step 104 to connect to the video conference call. The server 10 may provide to the first mobile terminal A1 information relating to the meeting and video conference call. The meeting and video conference call information received at the first mobile terminal A1 from the server 10 may be made available by the first mobile terminal A1 to the user's second mobile terminal A2. In any event, information is made available in a step 105 by a scannable code such as a QR code displayed on a screen of the second mobile terminal A1 and read by a scanner of the first mobile terminal A1, but it may be made available by other means such as by a WiFi or Bluetooth connection between the first and second mobile terminals A1, A2. This information comprises identity information and a log in request of the second mobile terminal A2 which, when combined with the meeting and video conference call information received by the first mobile terminal A1, enables the second mobile terminal A2 to also join the video call in a replication of step 104. The meeting and video conference call information could be provided by the server 10 directly to the second mobile terminal A1 and, in this embodiment, the first mobile terminal A1 may provide information about the second mobile terminal A2 directly to the server 10 to facilitate a direct connection between the server 10 and the second mobile terminal A2 without the need for the first mobile terminal A1 to make any information available to the second mobile terminal A2. The scannable code such as a QR code displayed by the user's second mobile terminal A1 may include data comprising one or more account IDs for the user, one or more passwords for the user for said user's one or more accounts, a meeting ID, and a mobile APP reference for the application used by the first mobile terminal A1.

In another embodiment, the first mobile terminal A1 makes available the meeting and video conference call information by way of, for example, a scanable code which is read by a scanner of the second mobile terminal A2. In this embodiment, the user arranges his second mobile terminal A2 to scan the code displayed by his first mobile terminal A1 to retrieve the meeting and video conference call information. The user then arranges his second mobile terminal A2 to connect to the server 10 and use the meeting and video conference call information to join the video conference call. The user's second mobile terminal A2 preferably provides a drawing board, message board or the like to enable the user to create, edit, modify, comment on and view images, text documents, messages and the like exchanged between users' second mobile terminals A2 during the video conference call.

Figure 3:
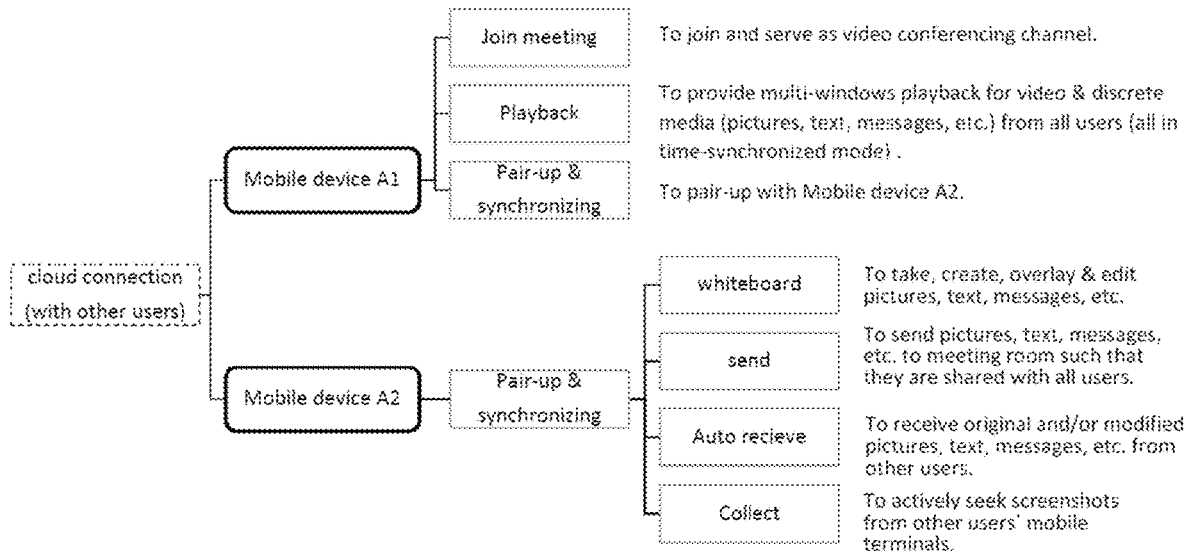
FIG. 3 is a schematic representation of a further preferred method for a user to log in and join a video conference call using first and second mobile terminals.

Referring to FIG. 3 shown is a schematic representation of a preferred method for a user A to create, log in and join a video conference using his first and second mobile terminals A1, A2. In this preferred method, user A's first mobile terminal A1 can be used to connect to the server 10 to create a booking for a meeting for a video conference call and to invite other users to participate in the call. As in FIG. 2, once the booked time of the meeting has arrived, user A uses his first mobile terminal A1 to log in and join the booked meeting and establish the video conference call. Also as before, information for the meeting and the conference call may be made available by the first mobile terminal A1 to user A's second mobile terminal A2 which may pair up with the first mobile terminal A1 to retrieve the meeting and conference call information and thereafter use said information to connect with the server 10 and join the video conference all. In this embodiment, the user's first mobile terminal A1 may be configured to playback the meeting or part of the meeting using data recorded and time-stamped by the server 10. The time-stamping enables the data to be replayed in sequence. Furthermore, the server 10 may record the data with the identities of the users who created and transmitted the data so that any user may retrieve a personal record of the meeting to playback on his first mobile terminal A1 in addition to or as an alternative to a global playback version of the recorded data, i.e. a recorded version of the data comprising all users' inputs, etc. The user's first mobile terminal A1 may be configured to playback the recorded data in multiple windows on its screen. Respective ones of the multiple windows may be arranged to display the video data from respective users which may include the user associated with the playback terminal A1 or to display the video data of only user selected ones of the other users. The multiple windows may be configured to provide at least one window displaying the discrete media data exchanged by the users. This is preferably replayed in accordance with the recorded timestamps for such data. Furthermore, the discrete media data may be separated into discrete media data types, e.g. still images, text documents, SMS messages, with each discrete type of media data being replayed on a respective window and preferably replayed in accordance with the recorded timestamps for such data. The user's second mobile terminal A2 is configured to provide a message, whiteboard and the like to enable discrete media data as aforesaid to be created, transmitted, received, edited, modified and otherwise manipulated by each user and exchanged during the course of the video conference call. Sending of such discrete media data may be by choice, i.e. input command, of a user or automatically under control of the server 10 and the mobile terminal APP(s). Similarly, discrete media data communicated by other users may be automatically received at each other user's second mobile terminal A2, but, in some embodiments, the server 10 and other user's second mobile terminal APPs may enable a user to 'collect', i.e. request retrieval, of a still screen image or the like from another user's first and/or second mobile terminals A1, A2.

Figure 4:
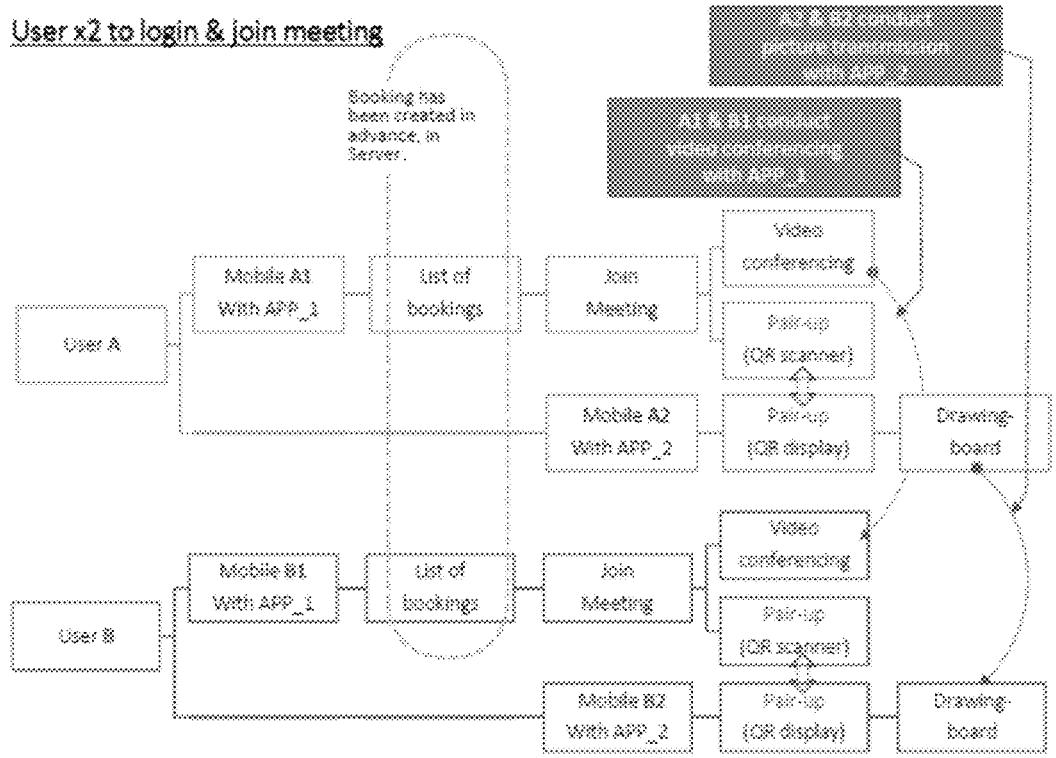
FIG. 4 is a schematic representation of a preferred method for multiple users to log in and join a video conference call using respective first and second mobile terminals.

Referring to FIG. 4, shown is a schematic representation of the preferred method for multiple users A, B to log in and join a video conference using their respective first and second mobile terminals A1, A2, B1, B2. The process illustrated in FIG. 4 is generally the same for each user A, B as that described with respect to FIG. 2, but further illustrating that the video conference call is implemented by the users' first mobile terminals A1, B1 and the exchange of discrete media data is implemented by the users' second mobile terminals A2, B2. Also illustrated in this embodiment is the case that each of the users' first mobile terminals A1, B1 use a first APP_1 whilst the users' second mobile terminals A2, B2 use a separate APP_2. However, it will be understood that all of the users' mobile terminals may use the same single APP.

Preferably, the server 10 allocates to the video call connection between the users' first mobile terminals A1, B1 its own data transmission channel or channels and allocates to the information transmission communication connection between the users' second mobile terminals A2, B2 its own data transmission channel or channels. Preferably, the video call channel(s) and the discrete data transmission channel(s) are configured with the same time axis or time frame, i.e. the timing of the channels is synchronized by the server 10.

Referring again to FIG. 1, in preferred embodiments of the present invention, during the video call process performed by the first mobile terminals 20, a time of creation and/or communication of a discrete media file or message at any second mobile terminal 30 is recorded for the data of said discrete media file or message by applying a timestamp to said data. The timestamp therefore verifies that the discrete data comprising the information transmission communication exists at a specific time point. The timestamp not only provides a user with a proof of transmission of that user's discrete data at a known point of time during the video call timeline, but enables all users' data to be sequenced in accordance with the video call timeline for playback and other purposes. The timestamp also enables a specific user to know when the discrete data was generated on their second mobile terminal 30. For example, where a user has received a text document or a drawing from another user and has subsequently edited said text document or drawing, the timing of the edits will be established by the timestamp applied to each version of the edited text document or drawings irrespective of whether or not the each or all of the edited versions prepared by the specific user are communicated to other users. In effect, the timestamp not only enables a global record to be generated of all discrete information exchanged by users whether of original or modified content, but enables each user to have a personal record of the discrete data they have communicated, created and/or generated during the course of the video call.

In some embodiments, discrete media data may be recorded as it is created or transmitted and/or it may be recorded on a periodical basis. For example, the server 10 may be configured to record user's input on their second mobile terminals 30 every 2 seconds to thereby provide 30 images per minute of the screen of each user's second mobile terminal screen. The same time period basis may also be used when playing back the users' inputs to their second mobile terminals such that recorded images are 'flipped' when being played back at a given rate based on the selected time period for recording and/or playback of such image data.

For example, when a user wishes to share a picture or text with other users at a certain moment during the video call process, the user may share pictures or texts on his second mobile terminal 30 which are timestamped in accordance with the synchronized timeline provided by the server 10 for the video call. Preferably, the server 10 is configured to share discrete media data such as images, text documents, SMS messages or the like in real time, so that other users can browse, comment on and/or edit such images, text documents, SMS messages or the like. It should be noted that, in some embodiments, the information transmission communication may include documents such as notepads, word documents, pdf documents, and the like. The information transmission communication may also include edits to documents including, but not limited to, superimposed text, hand-drawn images and even audio comments, all of which will also be timestamped at their time of transmission and may also be timestamped at their time of creation if they are not communicated immediately on creation.

In some embodiments, during the information transmission communication performed by the second mobile terminals 30, editing and processing of changes to discrete media data is preferably performed by users on their respective second mobile terminals 30. Where a user edits, for example, a text document for sharing with other users, the server preferably repeatedly superimposes the edit information as it is being sequentially created by the user for two-way communication so as to enhance all of the users' experience of expressing opinions and submitting edits to exchanged discrete media data during the video call. For example, during a video call, "User 1" may share a picture ("Picture 1"), while "User 2" wishes to overlay information on "Picture 1" and share this with at least "User 1". After "User 2" edits "Picture 1" on his second mobile terminal 30 to overlay information by, for example, handwriting or typing such information in real time, the modified picture is transmitted by "User 2" to the server 10 which processes the modified picture and shares it with other users in the video call. Other users can also modify the picture to thereby provide information superimposed on the picture in an interactive manner thus enabling an exchange of information, opinions and/or views between the users on the video call.

In preferred embodiments of the present invention, in order to facilitate a user to review the video call after the call has ended, the video call may be recorded by the server 10 and stored in a database 15 provided by or associated with the server 10. The recorded video call stored by the server 10 preferably comprises a record of all user video views from their first mobile terminals 20 and any discrete media data communicated by their second mobile terminals 30, all of said data being timestamped in accordance with the timeline of the video call. Consequently, the server 10 stores the video call and any exchanged information such as pictures, texts, SMS messages, audio notes in chronological order using the time stamp in accordance with the video call's timeline. As described above, by provisioning the synchronization of data recording/storage through the video call timeline by recording the times, i.e. timestamping, when any exchanged information such as pictures, texts, SMS messages, audio notes was transmitted by any of the users' second mobile terminals 30, the server 10 stores a complete record of the video call in accordance with its timeline. This enables any user to request replay of part or all of the video call and to customize which users' input they wish to see replayed, although the default is to replay all if no customization by a user is provided.

The server 10 may be configured to record video call data in a set of recordings such that there exists in the database 15 a separate video call recording for each user and also a separate discrete information connection recording for each user. This allows users greater flexibility in customizing which users' contributions to the video call they wish to see played back.

When requesting a playback of the video call, whether original or customized, a user receives at one or both of his first and second mobile terminals 20, 30 from the server 10 data comprising the requested video call playback. For example, the user may receive the playback data at their first mobile terminal 20 which is preferably configured to display the various separate user video call inputs and the various separate user discrete media data inputs on respective window portions of the screen of their first mobile terminal 20. In some embodiments, the video call input and the discrete media data input for one of the users is played in a single window portion with the discrete media data overlaid on said single window portion. In another embodiment, the video call inputs for the users are played back in respective window portions whereas the discrete media data inputs for all users or for selected users are replayed in a single window portion in chronological order based on the time stamping data.

It will be understood that the server 10 may be configured to provide the video call playback data on request to users who did not participate in the video call so that non-participating users can subsequently browse the video call and discrete media data exchange.

Where the video call goes offline for some reason for one, more than one or even all of the users participating in the video call, the server 10 may be configured to enable any user to reconnect to the video call and the discrete media data exchange to thereby reconnect with other participants. During any such offline period, the data recording will be terminated, but recommences once at least one user reconnects to the call. More importantly, the recommenced recording follows the unique timeline and timestamping as that used before the offline event. This means that, no matter if the data recording is significantly fragmented due to one or more offline events, playback can be conducted with good synchronization and sequencing in an almost seamless manner which presents the video call as an apparently continuous, uninterrupted session. One benefit is that users need not to join a video call meeting at the same time as playback can still be conducted in good sequence, aligned with the unique timeline of the video call.

In order to ensure that a user communicates correctly during a video call, the server 10 may monitor the log in of each first mobile terminal 20 and each second mobile terminal 30 to provide an online state and an offline state for each participant. In some embodiments, the log in status of a user may be displayed in a prominent position on the screens of the user's first mobile terminal 20 and second mobile terminal 30. If the user's first mobile terminal 20 or the user's second mobile terminal 30 goes offline, the user may be prompted to log in again on at least the offline terminal to keep the video call continuing smoothly for that user.

The first mobile terminal 20 may be any suitable device that is configured with the functions of sending a log in request, completing a video call, or the like, for example, a laptop computer, a tablet computer, a phablet, a smartphone, or the like. The second mobile terminal 30 may be any suitable device, such as, for example, a laptop computer, a tablet computer, a phablet, a smartphone, or the like, configured with the functions of sending a log in request and completing information transmission and communication as herein described.

Embodiment 2

Figure 5:
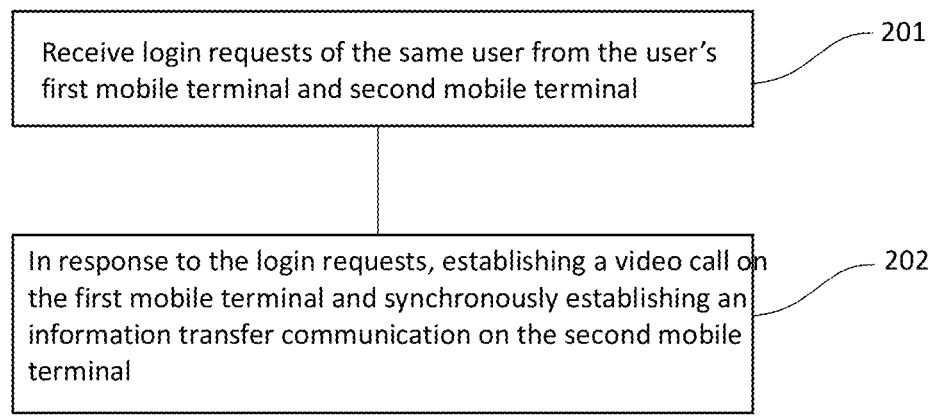
FIG. 5 is a schematic flowchart of a video call method according to an embodiment of the present invention.

FIG. 5 is a schematic flowchart of a video call method according to an embodiment of the present invention. As already described, a video calling method may be executed by the server 10 shown in FIG. 1, such as a cloud server for a large enterprise, a cloud server for a small and medium-sized enterprise, or the like.

Referring to FIG. 5, the method includes:

Step 201: Receive at the server 10 log in requests of the same user from the user's first mobile terminal 20 and the user's second mobile terminal 30.

Each participant in the video call preferably utilizes two mobile terminals, namely a first mobile terminal 20 and a second mobile terminal 30 respectively. The server 10 receives log in requests from the first mobile terminal 20 and the second mobile terminal 30 of the same user. This occurs for each user. The log in requests received by the server 10 may be log in requests sent based on the same log in account, or may be sent based on different log in accounts. The log in requests received by the server 10 may be log in requests sent using the same App, or may be sent using different APPs.

It should also be noted that the server 10 may be configured to simultaneously receive log in requests of the first mobile terminal 20 and the second mobile terminal 30 of a user or may receive the log in request of the first mobile terminal 20 and the second mobile terminal 30 at different times. For example, a log in request of a first mobile terminal 20 is received and processed by the server 10, and subsequently a log in request of the second mobile terminal 30 for the same user is received at the server 10.

Step 202: For each user, establish a video call on the first mobile terminal 20 based on a video call request according to the log in requests, and synchronously establishing an information transmission communication on the second mobile terminal 30.

Consequently, after receiving a log in request from the first mobile terminal 20 of a user and receiving a log in request from a second mobile terminal 30 of the same user, the server 10 allows the first mobile terminal 20 and the second mobile terminal 30 to log in to the video call. After logging in, the server 10 may receive the video call requests of the first mobile terminal 20 and the second mobile terminal 30, although the video call requests may form part of the respective log in requests. Based on the video call requests, the server 10 establishes a video call with the first mobile terminal 20 and synchronously establishes an information transmission communication with the second mobile terminal 30 so that the user does not need to suspend the video call when it is required to transmit discrete, i.e. non-video, media data from the user's second mobile terminal 30 to other users' mobile terminals. The server 10 performs the same process for each user operating first and second mobile terminals 20, 30.

Embodiment 3

Figure 6:
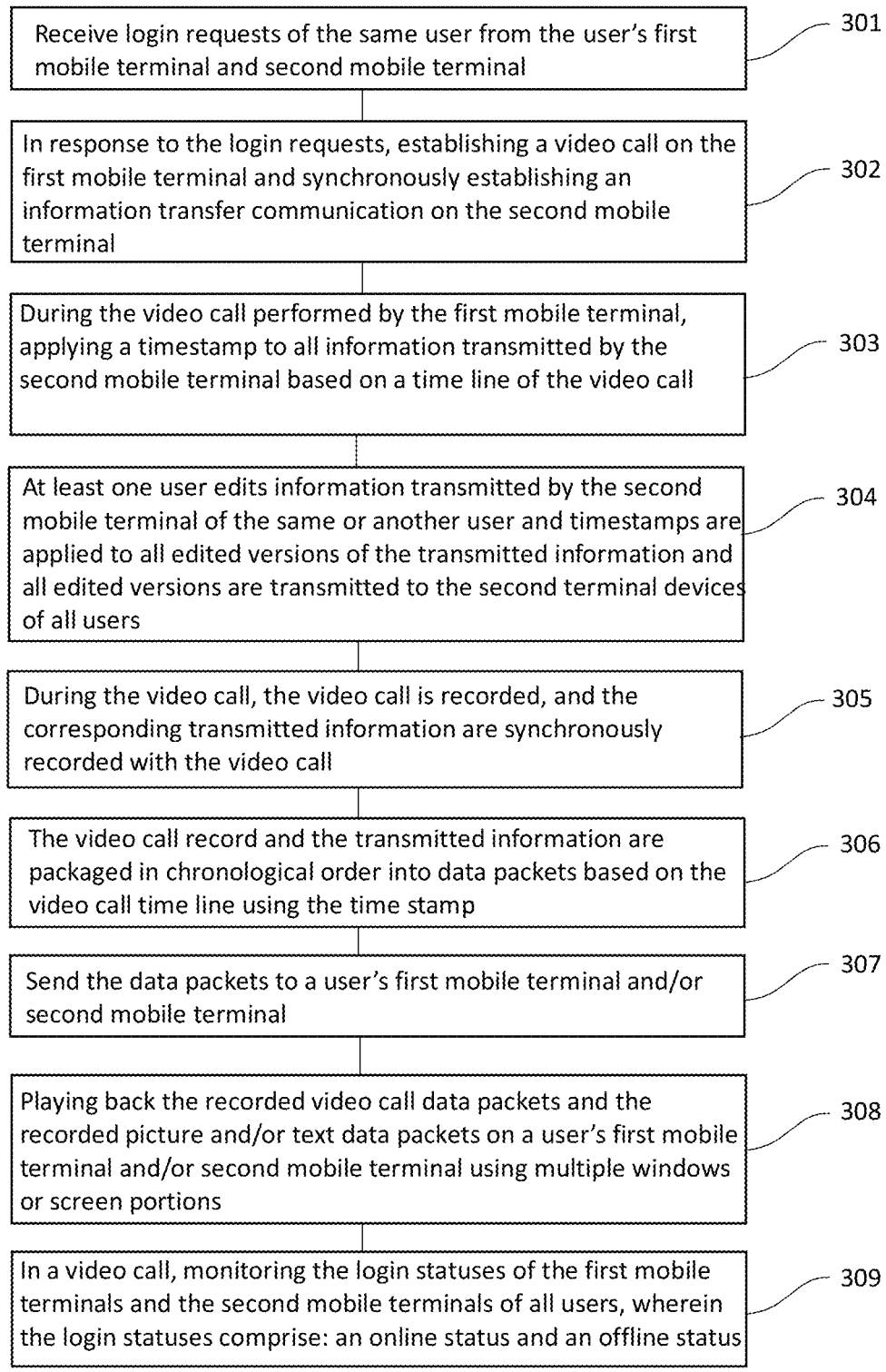
FIG. 6 is a schematic flow chart of a method for video calling according to another embodiment of the present invention.

FIG. 6 is a schematic flowchart of a video call method according to another embodiment of the present invention. A video calling method in accordance with this method of the present invention may be executed by the server 10 shown in FIG. 1.

Referring to FIG. 6, the method includes:

Step 301: Receive at the server 10 log in requests of the same user from the user's first mobile terminal 20 and the user's second mobile terminal 30.

Step 302: For each user, establish a video call on the first mobile terminal 20 based on a video call request according to the log in requests, and synchronously establishing an information transmission communication on the second mobile terminal 30.

Step 303: For each user, recording, by using a timestamp, a time corresponding to the information transmission communication performed by the second mobile terminal 30 during the video call process performed by the first mobile terminal 20.

Step 304: In the process of information transmission of discrete media data performed by the second mobile terminal 30 of one user, information is superimposed repeatedly by at least the same user or other users editing and processing the discrete media data on their respective second mobile terminals 30.

Step 305: During a video call, record the video call, and synchronously record the corresponding transferred discrete media data, both original and when modified.

Step 306: Store video call recordings and exchanged discrete media data in chronological order into data packets by using the time stamp based on the video call timeline.

Step 307: Send recorded data a user's first mobile terminal 20 and/or the user's second mobile terminal 30.

The server 10 may send the recorded data packet to a user's first mobile terminal 20 and/or the user's second mobile terminal 30 after a video call or even during a video call.

The server may send the recorded data to mobile terminals of other users who are not participating in the video call so that such other users who are not participating in the video call can browse the video call.

Step 308: Playback the recorded video call data and the discrete media data on a user's first mobile terminal 20 and/or the user's second mobile terminal 30 using a split screen or separate window portions for different users data inputs.

Step 309: Monitor a log in status of a user's first mobile terminal 20 and the user's second mobile terminal 30 during a video call, where the log in status includes: an online status and an offline status.

It will be understood that 309 is not essential to the implementation of the method of the invention. It will also be understood that not all of steps 301 to 308 are essential to the implementation of the method of the invention and that a person of ordinary skill in the art will understand from the description of the present invention that, in different embodiments, the steps 301-308 and step 309 may have different execution orders and that the steps 301-308 and step 309 may also be performed simultaneously.

Embodiment 4

Figure 7:
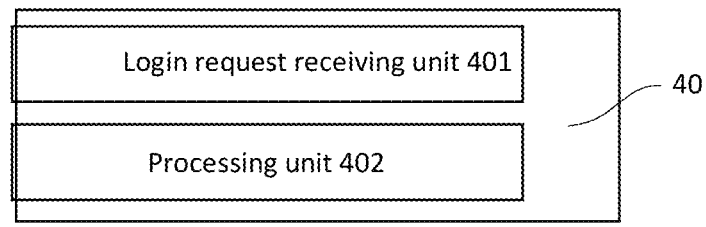
FIG. 7 is a schematic diagram of a video calling device provided in an embodiment of the present invention.

FIG. 7 is a schematic diagram of a video call apparatus such as a data processing device, e.g. server, according to an embodiment of the present invention.

Referring to FIG. 7, the data processing device 40 includes a log in request receiving unit 401 configured to receive one or more log in requests of the same user from the user's first mobile terminal and the user's second mobile terminal.

In this embodiment of the present invention, each video participant in a video call carries two mobile terminals, namely a first mobile terminal and a second mobile terminal respectively. The log in request receiving unit 401 may receive a log in request from a user's first mobile terminal and also a log in request from the same user's second mobile terminal, where the log in requests received by the data processing device 40 may be log in requests sent based on the same user log in account or may be based on different user log in accounts as hereinbefore described.

The processing unit 402 is configured to establish a video call with each user's first mobile terminal and to synchronously establish an information transmission communication with each user's second mobile terminal.

Embodiment 5

Figure 8:
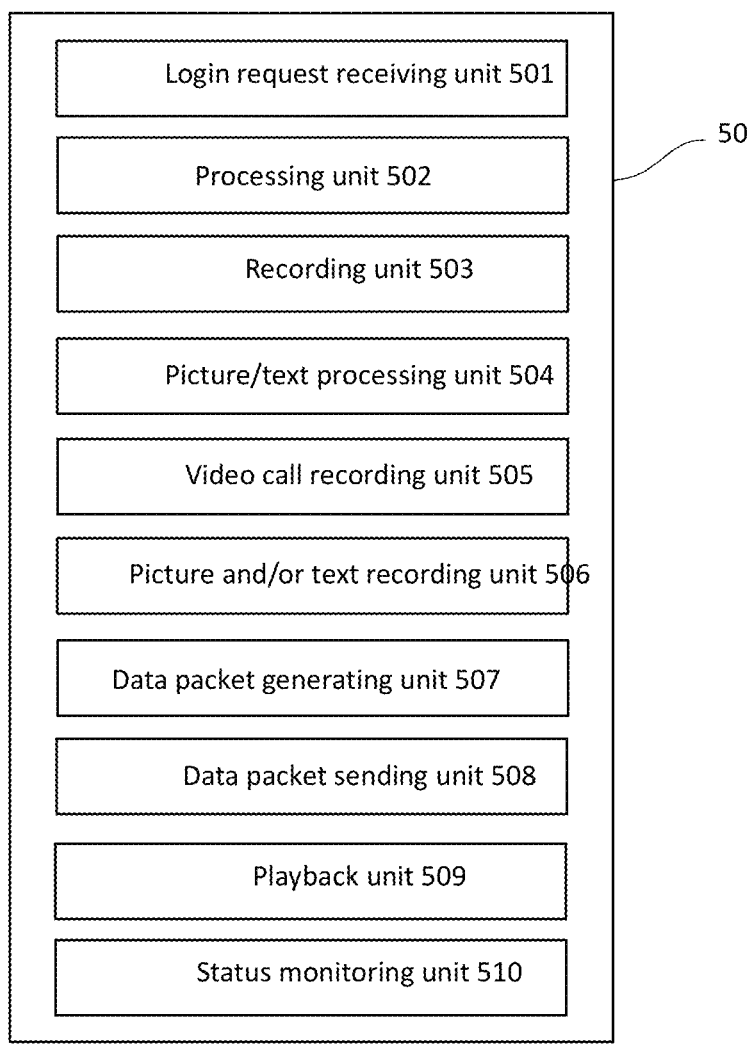
FIG. 8 is a schematic diagram of a video call apparatus according to an embodiment of the present invention.

FIG. 8 is a schematic diagram of a video call apparatus such as a data processing device, e.g. server, according to an embodiment of the present invention.

Referring to FIG. 8, the data processing device 50 includes a log in request receiving unit 501 configured to receive one or more log in requests of the same user from the user's first mobile terminal and the user's second mobile terminal.

The video-call apparatus further includes a processing unit 502 configured to establish a video call on each user's first mobile terminal based and synchronously establish an information transmission communication on each user's second mobile terminal.

The video-call apparatus may further include a recording unit 503 configured to record, by using the timestamp, a time corresponding to the information transmission communication performed by a user's second mobile terminal during the video call process performed by the user's first mobile terminal.

The video-call apparatus may further include a picture processing unit 504 configured to iteratively superimpose the information in the information transmission communication by at least one user editing and processing discrete media data on the user's second mobile terminal.

During the information transfer communication performed by a user's second mobile terminal where said user shares discrete media data such as a text document, text message, still image, drawing or the like with other users, the discrete media data may be edited and processed on any user's second mobile terminal by at least one user using for example, a digital drawing board. In response, the picture processing unit 504 may be configured to repeatedly superimpose user's edit information or the like to the discrete medium defined by the discrete media data in order to enhance the users' experience of sharing information, suggesting changes and/or expressing opinions in the video call.

The video-call apparatus may further include a video call recording unit 505 configured to record the video call data during a video call as hereinbefore described.

The video-call apparatus may further include a picture and/or text recording unit 506 configured to synchronously record the corresponding transmitted discrete media data such as pictures and/or text during the video call.

In order to enable a user to review the video call after the video call has ended or even during the video call, the picture and/or text recording unit 506 synchronously records any images and/or text transmitted by any of the users' second mobile terminals whilst the video call recording unit 505 records the video call feeds or video inputs of the users' first mobile terminals.

A data packet generating unit 507 is configured to packetize the recorded video call data and the recorded image and/or text data into data packets for storing in the database 15. The data packets are stored with a time stamp based on the timeline of the video call session.

The video-call apparatus may further include a data packet sending unit 508 configured to send stored data packets to a user's first mobile terminal and/or the second mobile terminal after a video call or even during a video call to enable said user to replay the video call or part of the video call. It should be noted that the data packet sending unit 508 may send the data packets to the mobile terminals of other users who are not participating in the video call so that such other users not participating in the video call can browse the video call or part of the video call.

The video-call apparatus may further include a playback unit 509 is configured to play back the stored video call recording and the stored picture and/or text data on a user's first mobile terminal and/or the user's second mobile terminal in the manner hereinbefore described.

The video-call apparatus may further include a status monitoring unit 510 configured to monitor the log in statuses of the users' first mobile terminals and the second mobile terminals during the video call.

Embodiment 6

Figure 9:
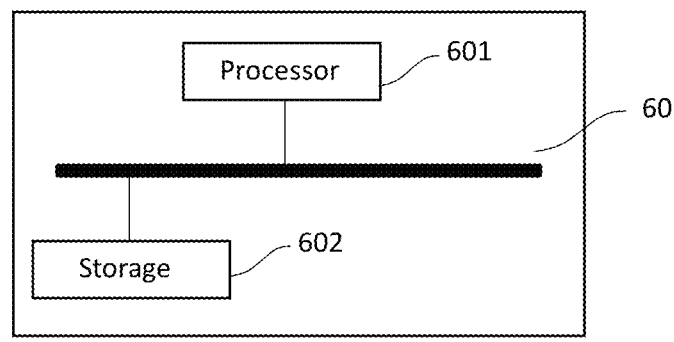
FIG. 9 is a schematic diagram of a hardware structure of a cloud server according to an embodiment of the present invention.

FIG. 9 is a schematic structural diagram of a hardware structure of a (cloud) server according to an embodiment of the present invention. The cloud server 60 includes one or more processors 601 and a memory 602, although only one processor 601 is shown in FIG. 9. The processor 601 and the memory 602 may be connected by a bus.

The memory 602 comprises a non-transitory computer-readable storage medium which may be used for storing non-volatile software programs, non-volatile computer executable programs and/or modules, such as a program, APP or APPs, for implementing the video call method of the present invention when the non-volatile software programs, non-volatile computer executable programs and/or modules are executed by the one or more processors 601. Any of the log in request receiving unit 501, the processing unit 502, the recording unit 503, the picture processing unit 504, the video call recording unit 505, the picture and/or text recording unit 506, the packet generation unit 507, the data packet sending unit 508, the playback unit 509, and the status monitoring unit 510) may be implemented through non-volatile software programs, non-volatile computer executable programs and/or modules being executed by the one or more processors 601.

The memory 602 may include a program storage area and a data storage area. The program storage area may store an operating system and at least one application required by the video call method of the invention. The data storage area may store data created, received and/or processed by the server during a video call in accordance with the method of the invention. In addition, the memory 602 may include a high-speed random access memory and may also include non-volatile memory such as at least one magnetic disk storage device, flash memory device, or other non-volatile solid-state storage device. In some embodiments, memory 602 optionally includes memory remotely located with respect to processor 601, which remote memory may be connected to the users' mobile terminals via a communication network. Examples of such networks include, but are not limited to, the Internet, an intranet, a local area network, a mobile communications network, and any combinations thereof.

The one or more non-volatile software programs, non-volatile computer executable programs and/or modules are stored in the memory 602 and, when executed by the one or more processors 601, perform the videoconferencing method in any of the embodiments hereinbefore described. For example, the method steps 301 to 309 shown in FIG. 6 and described above are performed to implement the functions of one or more of the units 501-510 shown in FIG. 8.

Embodiment 7

Figure 10:
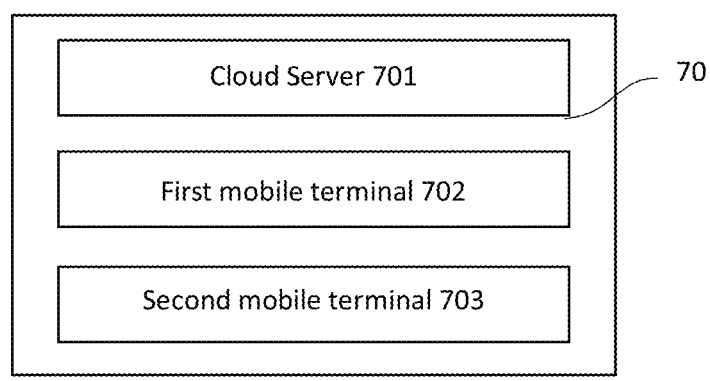
FIG. 10 is a schematic diagram of a video call system according to an embodiment of the present invention.

FIG. 10 is a schematic diagram of a video call system according to an embodiment of the present invention. As shown in FIG. 10, the system 70 includes a cloud server 701, a first mobile terminal 702, and a second mobile terminal 703. The cloud server 701 may comprise the server described in Embodiment 6 which can execute the video call method described with respect to Embodiment 2 and/or Embodiment 3 of the present invention and has the function modules and beneficial effects corresponding thereto.

The invention therefore provides a method of communicating electronically, the method comprising the steps of: establishing electronic communication of a first media type between a first electronic communication device of a user and a data processing device; and establishing electronic communication of a second, different media type between a second electronic communication device of the same user and said data processing device.

Preferably, the electronic communication of the first media type comprises a continuous communication of media data of the first type between the first electronic communication device and said data processing device and the electronic communication of the second, different media type comprises a discrete communication of media data between the second electronic communication device and said data processing device.

Preferably also, the continuous communication of media data between the first electronic communication device and said data processing device comprises communication of video data and the discrete communication of media data between the second electronic communication device and said data processing device comprises communication of discrete media data including, but not limited to text, messages, drawings and still images.

The communication of video data between the first electronic communication device and said data processing device may comprise establishing at least one video conference channel between the first electronic communication device and said data processing device and the communication of discrete media data between the second electronic communication device and said data processing device comprises establishing a discrete media exchange channel between the second electronic communication device and said data processing device.

The data processing device may simultaneously process video data from the first electronic communication device and discrete media data from the second electronic communication device and renders said video data and discrete media data for display on one or more display devices.

The data processing device applies a timestamp to some or all of the discrete media data received by said data processing device and stores some or all of the timestamped discrete media data.

The data processing device applies the timestamp to some or all of the video data received by said data processing device stores some or all of the timestamped video data.

Preferably, the data processing device comprises at least one server and said server is configured to simultaneously process video data from the first electronic communication device and discrete media data from the second electronic communication device and to communicate said video data and discrete media data for display on one or more other electronic communication devices.

The step of establishing electronic communication of a first media type between the first electronic communication device of the user and the data processing device may comprise receiving a log in request at said data processing device from said first electronic communication device and the step of establishing electronic communication of a second media type between the second electronic communication device of the user and the data processing device may comprise receiving a log in request at said data processing device from said second electronic communication device.

Preferably, the first electronic communication device and the second electronic communication device share log in request data by pairing-up. The first electronic communication device and the second electronic communication device may pair-up by having the first electronic communication device read data displayed by the second electronic communication device or vice-versa. The first electronic communication device may read data displayed by the second electronic communication device by scanning a code displayed by the second electronic communication device or vice-versa.

Preferably, the data processing device establishes respective electronic communications of said first media type with first electronic communication devices of two or more users of a plurality of users and establishes electronic communication of said second, different media type with second electronic communication devices of the same two or more users of said plurality of users such that each of said two or more users has first and second electronic communication devices respectively communicating video data and discrete media data to the respective electronic communication devices of said others of said two or more users of said plurality of users.

Preferably also, the users of said electronic communication devices can edit discrete media data communicated by or to their respective second electronic communication devices and the data processing device timestamps any edited discrete media data received thereby.

The data processing device replays some or all of stored video data and/or stored discrete media data. The data is replayed in accordance with a sequence of the timestamp applied thereto. The data processing device replays both stored video data and discrete media data in accordance with a sequence of the timestamp applied thereto. Preferably, the data processing device replays the stored data in different windows on a screen of a display device.

The data processing device can communicate stored data in a compressed format for replay at a user's electronic communication device.

Preferably, in response to a request received from an electronic communication device of a first user, the data processing device transmits from an electronic communication device of a second user a screen capture image or a copy of a media data file being displayed on a screen of said electronic communication device of the second user.

The invention also provides a data processing device comprising a processor for executing machine code and a non-transitory storage device for storing machine code wherein, when said processor executes the machine code stored on the non-transitory storage device, the data processing device is caused to implement the steps of the method or methods as hereinbefore described.

The invention also provides an electronic communications system comprising a data processing device, a first electronic communication device associated with a user and a second electronic communication device associated with the same user. The system is arranged such that, when the data processing device is controlled to implement the steps of the method or methods as hereinbefore described, the data processing device establishes electronic communication of a first media type with the first electronic communication device and establishes electronic communication of a second, different media type with the second electronic communication device.

The invention also provides a non-transitory storage medium for a data processing device, said non-transitory storage medium storing machine code which, when executed by a processor causes the data processing device to implement the steps of the method or methods as hereinbefore described.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of communicating electronically, the method comprising the steps of:
   establishing a video call between a first electronic communication device of a first user and a first electronic communication device of a second user;
   establishing an information transmission communication connection between a second electronic communication device of the first user and a second electronic communication device of the second user for exchange of discrete media files during the course of the video call;
   configuring the video call and the information transmission communication connection with a same time axis or time frame;
   applying a time stamp in accordance with the time axis or time frame to any discrete media file data exchanged during the course of the video call;
   wherein the step of applying a time stamp enables the first user to retrieve a global record of discrete media files exchanged by the first user and the second user during the course of the video call and to obtain a personal record of discrete media files communicated by the first user during the course of the video call, said global record and personal record being synchronized with the video call in accordance with the time axis or time frame.

2. The method of claim 1, wherein the discrete media files include, but are not limited to text files, message files, drawing files and still image files.

3. The method of claim 1, wherein a server applies the timestamp to some or all of the discrete media file data received exchanged between said second electronic communication device of the first user and the second electronic communication device of the second user and stores some or all of the timestamped discrete media file data.

4. The method of claim 3, wherein the server applies the timestamp to some or all of the video data of the video call and stores some or all of the timestamped video data.

5. The method of claim 1, wherein the server is configured to simultaneously process video data from the first electronic communication device of the first user and discrete media file data from the second electronic communication device of the first user and to communicate said video data and discrete media file data for display on one or more other electronic communication devices.

6. The method of claim 1, wherein the step of establishing the video call between the first electronic communication device of the first user and the first electronic communication device of the second user comprises receiving a log in request at a server from at least said first electronic communication device of the first user.

7. The method of claim 6, wherein the step of establishing the information transmission communication connection between the second electronic communication device of the first user and the first electronic communication device of the second user comprises receiving a log in request at said server from at least said second electronic communication device of the first user.

8. The method of claim 7, wherein the first electronic communication device of the first user and the second electronic communication device of the first user share log in request data by pairing-up.

9. The method of claim 8, wherein the first electronic communication device of the first user and the second electronic communication device of the first user pair-up by having the first electronic communication device of the first user read data displayed by the second electronic communication device of the first user or vice-versa.

10. The method of claim 1, wherein a server establishes the video call between first electronic communication devices of two or more users of a plurality of users and establishes the information transmission communication connection between second electronic communication devices of the same two or more users of said plurality of users such that each of said two or more users has first and second electronic communication devices respectively communicating video data and discrete media file data to the respective first and second electronic communication devices of said others of said two or more users of said plurality of users.

11. The method of claim 10, wherein users of said first and second electronic communication devices can edit discrete media files communicated by or to their respective second electronic communication devices and the server time-stamps any edited discrete media file data.

12. The method of claim 10, wherein some or all of stored video data and/or stored discrete media file data can be replayed by users of said first and second electronic communication devices.

13. The method of claim 11, wherein stored video data and/or stored discrete media file data is replayed in accordance with a sequence of the timestamp applied thereto.

14. The method of claim 13, wherein both the stored video data and the discrete media data are replayed in accordance with a sequence of the timestamp applied thereto.

15. The method of claim 1, wherein the server can communicate stored video data and/or stored discrete media file data in a compressed format for replay at a user's electronic communication device.

16. The method of claim 10, wherein, in response to a request received from an electronic communication device of a first user, the server transmits from an electronic communication device of a second user a screen capture image or a copy of a media file being displayed on a screen of said electronic communication device of the second user.

17. A data processing device comprising:
   a processor for executing machine code; and
   a non-transitory storage device for storing machine code;
   the data processing device being configured such that,
      when said processor executes the machine code stored on the non-transitory storage device, the data processing device is caused to:

establish a video call between a first electronic communication device of a first user and a first electronic communication device of a second user;

establish an information transmission communication connection between a second electronic communication device of the first user and a second electronic communication device of the second user for exchange of discrete media files during the course of the video call;

configure the video call and the information transmission communication connection with a same time axis or time frame;

apply a time stamp in accordance with the time axis or time frame to any discrete media file data exchanged during the course of the video call;

wherein the step of applying a time stamp enables the first user to retrieve a global record of discrete media files exchanged by the first user and the second user during the course of the video call and to obtain a personal record of discrete media files communicated by the first user during the course of the video call, said global record and personal record being synchronized with the video call in accordance with the time axis or time frame.

18. A non-transitory storage medium for a data processing device, said non-transitory storage medium storing machine code which, when executed by a processor causes the data processing device to:

establish a video call between a first electronic communication device of a first user and a first electronic communication device of a second user;

establish an information transmission communication connection between a second electronic communication device of the first user and a second electronic communication device of the second user for exchange of discrete media files during the course of the video call;

configure the video call and the information transmission communication connection with a same time axis or time frame;

apply a time stamp in accordance with the time axis or time frame to any discrete media file data exchanged during the course of the video call;

wherein the step of applying a time stamp enables the first user to retrieve a global record of discrete media files exchanged by the first user and the second user during the course of the video call and to obtain a personal record of discrete media files communicated by the first user during the course of the video call, said global record and personal record being synchronized with the video call in accordance with the time axis or time frame.

19. The method of claim 1, wherein the step of applying a time stamp enables the first user to replay all or part of the video call with one or both of the global record or the personal record.

* * * * *